Figure 1:
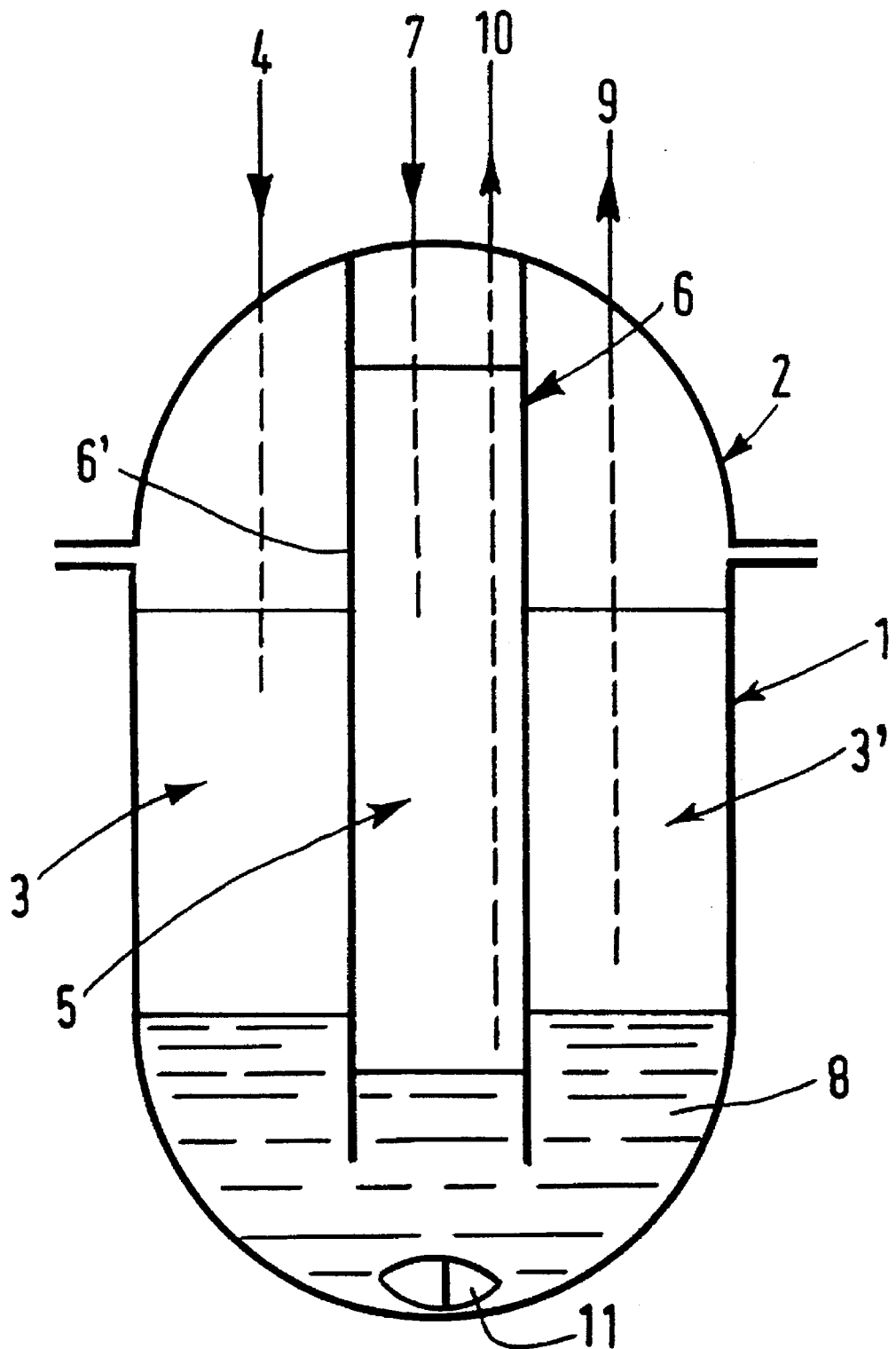

United States Patent [19]

Martin

[11] Patent Number: 5,633,125
[45] Date of Patent: May 27, 1997

[54] PROCESS FOR EXTRACTING HALIDE IONS FROM FIXING BATHS USED IN PHOTOGRAPHY

[75] Inventor: Didier J. Martin, Givry, France

[73] Assignee: Eastman Kodak Company, Rochester, N.Y.

[21] Appl. No.: 597,305

[22] Filed: Feb. 6, 1996

[30]  Foreign Application Priority Data

Mar. 2, 1995 [FR] France .................................. 95 02669

[51] Int. Cl.$^6$ ........................................ G03C 5/395
[52] U.S. Cl. ............................... 430/398; 430/400
[58] Field of Search ............................. 430/398, 400

[56]  References Cited

U.S. PATENT DOCUMENTS 3,925,175  12/1975  Fisch et al. ............................. 205/571
5,219,717   6/1993  Schmittou et al. ..................... 430/398

FOREIGN PATENT DOCUMENTS

0348532B1  12/1994  European Pat. Off. .

OTHER PUBLICATIONS

V. T. Stannett & W. J. Koros, Recent Advances in Membrane Science and Technology, (1979), pp. 69–121.

R. M. Izatt, et al., "Facilitated Transport from Ternary Cation Mixtures Through Water–Chloroform–Water . . . ", (1984), pp. 273–284.

J. D. Lamb, et al., "Effect of Salt Concentration and Anion on the Rate of Carrier–Facilitated . . . ", (1980), pp. 3399–3403.

Primary Examiner—Hoa Van Le
Attorney, Agent, or Firm—J. Richard Everett

[57]  ABSTRACT

The invention concerns a process for the selective extraction of the halide ions from photographic fixing solutions.

The process consists of bringing the photographic fixing solution into contact with a liquid membrane comprising a solvent and a crown-ether carrier capable of carrying the halide ions from the fixing solution into an aqueous solution which is thus loaded with halides, and is then removed.

8 Claims, 3 Drawing Sheets

PROCESS FOR EXTRACTING HALIDE IONS FROM FIXING BATHS USED IN PHOTOGRAPHY

The present invention concerns a process and a device for extracting halide ions from the fixing solutions for silver halide photographic products with a view to recycling them. In particular, the invention enables the iodide or bromide ions to be eliminated from aqueous fixing solutions containing mainly thiosulfate as a fixing agent. According to the invention, extraction of the halide ions is performed by bringing the fixing solution into contact with a liquid membrane comprising macrocyclic compounds.

The basic process for obtaining a silver halide photograph consists of exposing a silver halide photographic product to actinic radiation which produces an image made visible by the chemical processing. The fundamental steps of this treatment comprise first of all the treatment of the product with a developer solution in which part of the silver halides is transformed into metallic silver.

In order to obtain black and white images, it is necessary to remove the undeveloped silver halides and, in order to obtain a color image, it is necessary to eliminate all the silver from the photographic product after the image has been formed. In black and white photography, removal of the undeveloped silver halides is obtained by dissolving them in a solvent for silver halides known as a fixing solution and used in a fixing bath. In color photography, removal of the silver is obtained by oxidizing the metallic silver and dissolving the oxidized metallic silver and the undeveloped silver halides. Oxidation of the metallic silver is obtained by means of a bleaching agent and dissolving of the oxidized silver and undeveloped silver halides is obtained by means of a fixing bath.

It is highly desirable to process the photographic products as quickly as possible. In particular, the fixing stage must be as short as possible.

During the processing, reaction products accumulate in the fixing baths. These products, mainly dissolved silver and halide ions, retard the fixing reaction and make the fixing bath less effective. In order to remedy this, the spent solution is reactivated by introducing a regeneration solution (replenisher) after a certain quantity of photographic product has been processed. This does not prevent the undesirable substances from accumulating in the processing solution, so that finally the activity of the solution can no longer be generated by an addition of fresh liquid. In practice, when the regeneration solution is introduced into the processing tank, an equivalent quantity of spent solution is discharged through an overflow. In order to reduce the concentration of undesirable substances, it is necessary to discharge a very high quantity of spent processing solution.

In addition, in order to generate as little pollution as possible, it is necessary to use quantities of chemical products which are as small as possible. One method of reducing the quantities of effluents discharged is to use low regeneration levels in the processing solutions, which makes it possible to reduce the volume of the solution which is discharged through the overflow into the sewage system. If the regeneration levels are reduced, the concentrations of silver and halides increase further and the restraining effect becomes more marked. It is therefore possible to use low regeneration levels only by eliminating the undesirable substances from the fixing solutions.

The degree of fixing can be improved and the volume of the effluents reduced by eliminating the silver from the used or seasoned fixing baths, by chemical or electrochemical means. However, such treatments do not eliminate the halide ions and in particular the iodide ions, which have a very great restraining effect.

Thus, if the iodide and bromide ions could be removed from the fixing solutions, it would be possible to have faster fixing and this would prolong the life of the fixing bath, whilst using low regeneration levels.

Removal of the halide ions from the fixing bath is made difficult by the presence of other compounds in the solution, such as thiosulfate, sulfites and silver in chelated form. It is not desirable to eliminate the thiosulfate or sulfite ions, which are the active fixing agents. Unfortunately, many methods which could eliminate the iodide ions, such as oxidation, chelation and ion exchange, interfere with these other anions. The sulfite and thiosulfate ions are easily oxidized. Many substances which precipitate or chelate with iodide ions also react with thiosulfate ions. Ion exchange resins extract both iodide and thiosulfate ions. In addition, the problem of removal of iodide ions is made more difficult by the high concentration of compounds liable to interfere. The thiosulfate ions are generally present at a concentration of between 0.1 and 2.0 moles/liter. The sulfite ions are present at a concentration of between 0.01 and 1 mole/liter. The iodide ion concentration may be as high as 0.05 moles/liter, but it is desirable to keep it below 0.005 moles/liter. This is why it is essential for the system for removing iodide ions to be extremely selective.

U.S. Pat. No. 3,925,175 describes the removal of silver and halides by causing the fixing solution to pass into the cathode department of an electrolyser. The electrolytic cell comprises a semi-permeable membrane separating the anode and cathode and in addition a solution of electro-active oxidisable substances in the anode compartment. However, such semi-permeable membranes are expensive and easily blocked by the constituents in solution, which makes them ineffective for separation after only a short time. In addition, the process requires electrical equipment and consumes electricity, which increases the cost and complexity of the separation.

European patent 0 348 532 describes a process in which the fixing solution is brought into contact with an ion exchange resin in order to accelerate the fixing of the photographic product containing silver iodide and to reduce the quantity of effluents discharged. However, these resins eliminate ions other than iodide ions, such as thiosulfate and sulfite ions and chelated silver ions. This method cannot be used to eliminate iodide ions from solutions containing many other anionic compounds.

U.S. Pat. No. 5,219,717 describes a process for selectively eliminating iodide ions in fixing and bleaching/fixing baths in which an anionic surfactant is used, a medium absorbing the iodide ions and a polymer, the anionic surfactant having a charge opposite to that of the polymer. For example, the absorbent medium can be silver bromide and the polymer a methacrylate, methacrylamide, acrylate or acrylamide copolymer. This highly selective process enables iodide ions to be eliminated without modifying the thiosulfate concentration. However, the process is difficult to implement since it is necessary to circulate, in the tank containing the fixing bath, a polymer support strip covered with the compound absorbing the iodide ions and the surfactant.

This is why it is desirable to have a process which is simple to implement and which would make it possible to remove the halide ions selectively, in particular the iodide ions, from the fixing solutions.

This problem is resolved with the process according to the present invention for removing the halide ions from fixing solutions, a process in which a liquid membrane is used for the facilitated transport of the halide ions.

The liquid membranes for the facilitated transport of ions comprise in general terms a mobile carrier dissolved in an organic phase which constitutes the membrane, this mobile carrier having reactive groups which react with a specific solute to form a complex which is selectively transported through the membrane. After diffusing through the membrane in the form of a complex, the solute is released on the other side of the membrane. A chelating agent acting as a carrier reacts selectively and reversibly with the solute to be transported. Such membranes are described in the article by V T Stannet, W J Koros, D R Paul, H K Lonsdale and R W Walker, published in Recent Advances in Membrane Science and Technology, Adv. Polym. Sci., 32 (1979) 69–121; in the article by R M Izatt, J J Christensen et al, published in Journal of Membrane Science, 20 (1984) 273–284 and in the article by R M Izatt, J J Christensen et al, published in JACS, 102:10, May 1980, 3399–3403.

In the prior art, the problem of the selective removal of halide ions from fixing solutions is not resolved simply and the use of liquid membranes for resolving this problem is neither described nor suggested.

One object of the present invention is therefore to remedy the drawbacks of the processes of the prior art for the selective extraction of halide ions, in particular the halide ions in aqueous fixing solutions used in photography.

Another object of the present invention is to improve the performance of the fixing solutions without increasing the regeneration level and to reduce the fixing time by avoiding the loss of activity of the fixing solution.

Another object is to minimize the volume of the effluents coming from the photographic processes by recycling the fixing solutions after extracting the halide ions therefrom.

All these objects are achieved with the present invention, which consists of a process for the selective removal of the halide ions from photographic fixing solutions, in which a) the photographic fixing solution is brought into contact with a liquid membrane comprising a macrocyclic compound in solution in an organic solvent, so that the halide ions are transported from the photographic fixing solution in the liquid membrane, and b) the halide ions transported in the liquid membrane are extracted by bringing the membrane into contact with an aqueous solution, separate from the photographic fixing solution, characterized in that the macrocyclic compound is a crown-ether compound which comprises at least six oxygen atoms and possibly sulfur or nitrogen atoms, in which two adjacent oxygen, sulfur or nitrogen atoms are separated by an alkylene group of at least two carbon atoms.

The invention also concerns a device, shown in FIG. 1, for the selective extraction of halide ions from photographic fixing solutions, the said device comprising:

a) a first zone (3, 3') for receiving the photographic fixing solution, b) a second zone (5) separated from the first area by separation means (6), and c) a liquid membrane (8) for the selective transport of the halide ions from the first zone (3, 3') into the second zone (5), in contact with the said first and second zones, a device in which the liquid membrane comprises, in solution in an organic solvent, a crown-ether compound comprising at least six oxygen atoms and possibly sulfur or nitrogen atoms, in which two adjacent oxygen, sulfur or nitrogen atoms are separated by an alkylene group of at least two carbon atoms.

According to a preferred embodiment, the device also comprises:

d) means (4) for introducing the photographic fixing solution into the first zone (3, 3'), and e) means (7) for feeding the second zone (5) with an aqueous solution, f) means (9) for recovering the photographic fixing solution containing practically no more halide ions from the first zone (3, 3'), and g) means (10) for removing the aqueous solution containing halide atoms from the second zone (5), and optionally h) agitation means (11).

In the following description, reference will be made to the following figures:

FIG. 1, which shows a device for the extraction of halides according to the present invention.

Figure 2:
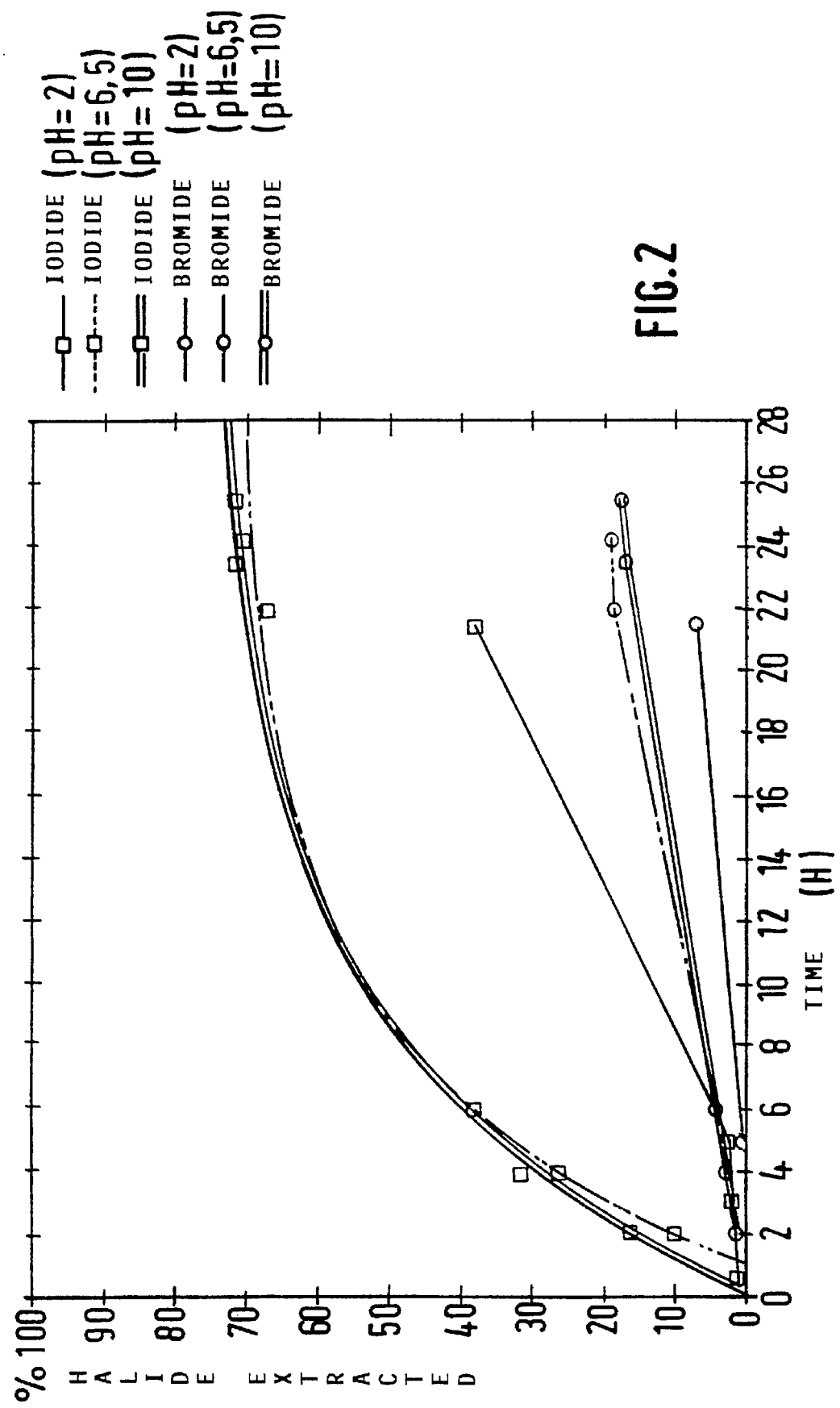

FIG. 2, which represents the percentage of iodide and bromide extracted versus the pH.

Figure 3:
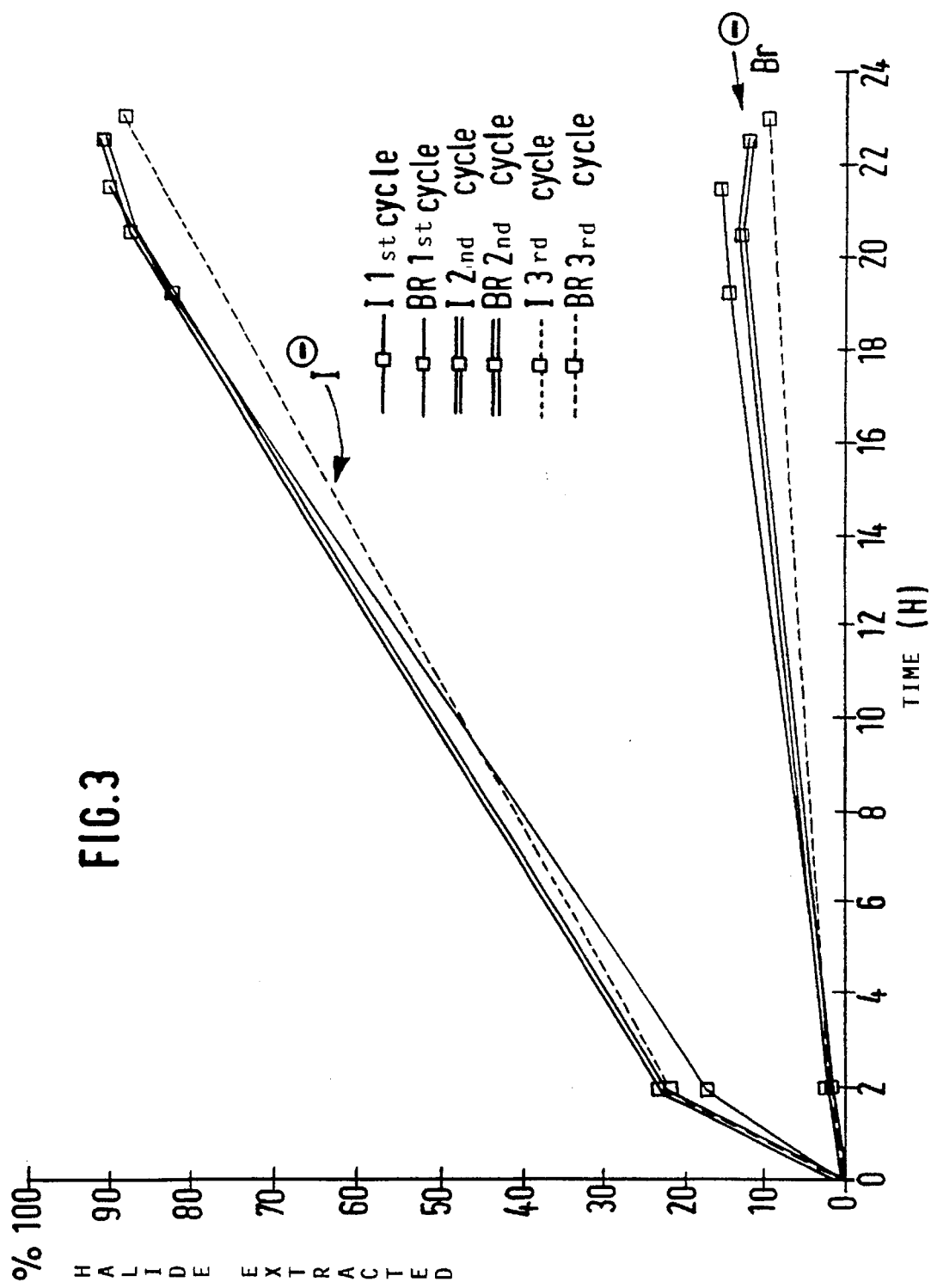

FIG. 3, which shows the stability of the membrane.

The liquid membranes used in the present invention comprise a macrocyclic compound in solution in a solvent. The macrocyclic compounds used in the present invention must be capable of chelating the $NH_4^+$, $Na^+$ or $K^+$ ions associated with the halide ions and transporting them with the associated halide ions from the fixing solution into the receiving aqueous solution, which is thus loaded with halides.

Examples of macrocyclic compounds which can be used in the present invention are the macrocyclic polyethers or "crown-ethers" described, for example, in "Crown compounds, their characteristics and applications", Michio Hiraoka, Elsevier 1982, ISBN 0-444-99692-3, "The chemistry of ethers, crown-ethers, hydroxyl groups and their sulfur analogues", Saul Patai, Interscience Publication, 1980, ISBN 0-471-27771-1, the cyclic compounds comprising atoms of oxygen, nitrogen such as "azacrowns" and/or sulfur in the ring, or ether compounds which, although they are not cyclic, have a molecule with a quasi-cyclic form.

Macrocyclic compounds which can used in the present invention comply with one of the following formulae:

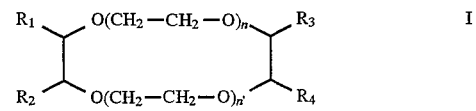

where $R_1$, $R_2$, $R_3$ and $R_4$ represent hydrogen or an alkyl, aryl, ester, amide, carboxy, ester, sulphonamido, sulfo, alkoxy, aryloxy or polyalkoxy group, or $R_1$ and $R_2$ and/or $R_3$ and $R_4$ represent the atoms required to complete an aliphatic or aromatic ring of 5 to 7 members optionally comprising oxygen, sulfur or nitrogen heteroatoms on the ring, n and n' are between 1 and 10, the total of n and n' being at least 4; or

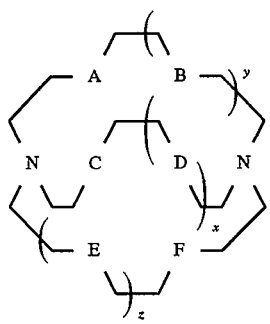

II where

A, B, C, D, E, F each represent separately an oxygen or sulfur atom, or N-R$_5$ where R$_5$ is hydrogen or an alkyl radical or else represents the atoms required to form, with two of the adjacent atoms, an aliphatic or aromatic ring of 5 to 7 members optionally comprising oxygen or sulfur atoms on the ring, x, y and z are between 1 and 3, with the proviso that the oxygen atoms total at least 6.

Preferred macrocyclic compounds are:

dibenzo-18-crown-6 of formula(A)

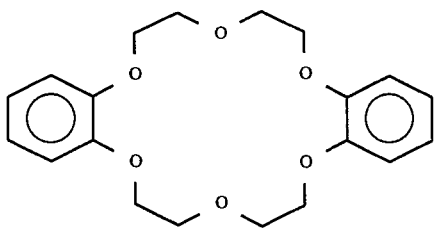

benzo-18-crown-6 of formula (B)

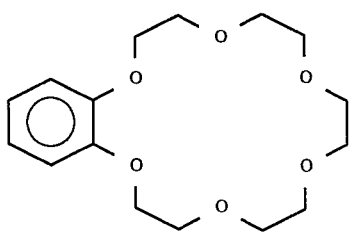

18-crown-6 of formula (C)

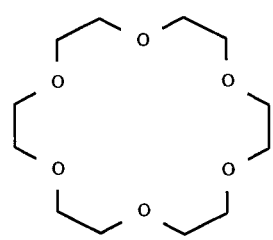

-continued
4,7,13,16,21,24-hexaoxa 1,10-diazabicyclo [8,8,8]-hexacosane of formula (D)

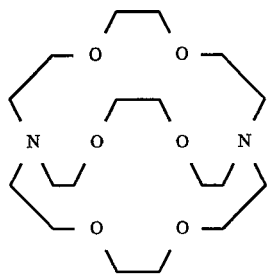

In the present invention, the macrocyclic compound is in solution in an organic solvent or in a mixture of organic solvents. Solvents which can be used are chloroform, dichloromethane, methanol, ethanol and toluene. A preferred organic solvent is chloroform.

The concentration of the macrocyclic compound in the organic solvent is between $10^{-6}$ and 1 mole/liter. A preferred concentration is between $10^{-2}$ and $10^{-1}$ mole/l.

The performance of the liquid membrane can be improved by preconditioning it before use by saturation with a halogenated ammonium or potassium salt such as, preferably, ammonium iodide or ammonium bromide.

The aqueous solution is a solution containing deionized water, distilled water or recycled water from the processing machine. The pH of this solution should preferably be between 6 and 10, experience having shown that an aqueous solution which is too acidic does not enable the halide ions to be extracted from the liquid membrane in a satisfactory manner. One advantage of the present invention is that the volume of the aqueous solution is very much less than the volume of the fixing solution being treated.

A device according to the present invention is shown diagrammatically in FIG. 1. A reactor (1) closed off by a cover (2) includes a first zone (3, 3') intended to receive the photographic fixing solution introduced by means (4), for example a pump, and a second zone (5) separated from the first zone by separation means (6, 6'), such as the cylindrical wall of a tube made from glass or any other material resistant to the organic solvents used. The second zone (5) is fed with an aqueous solution by means (7). A liquid membrane (8) for the selective transport of the halide ions is in contact with the first zone (3, 3') comprising the fixing solution to be purified and with the aqueous solution in the second zone (5). Means (9) for recovering the photographic fixing solution containing practically no more halide ions from the first zone (3, 3'), and means (10) for eliminating the aqueous solution containing halide ions from the second zone (5). An agitation device (11) is provided at the bottom of the reactor to ensure better diffusion of the halide ions through the membrane.

The aqueous solution containing halides can be discharged either sequentially or continuously, for example through an overflow.

The fixing solution with the halide ions removed can be stored with a view to subsequent use or preferably recycled continuously.

The following examples illustrate the invention.

EXAMPLES

In the reactor, 110 ml of liquid membrane is introduced, consisting of a $10^{-2}$ mole/l solution of crown-ether carrier in chloroform. The reactor is closed. 110 ml of fixing solution is introduced into the part (3, 3') of the reactor. 40 ml of deionized water is introduced into the central part (5). The contents of the reactor are stirred with a magnetic agitator.

The fixing solution has the following formula:

| | |
|---|---|
| ammonium thiosulfate | 0.36 moles/l |
| sodium sulfite | 1.03 moles/l |
| ammonium metabisulfite | 0.06 moles/l |
| ammonium bromide | 0.35 moles/l |
| ammonium iodide | 0.02 moles/l |
| silver nitrate | 0.0093 moles/l |
| acetic acid | 0.038 moles/l |
| ammonium hydroxide | to adjust the pH to 7.8 |

The thiosulfate, sulfite and bromide ions contained in the fixing solution and in the aqueous solution are analyzed by ion chromatography. The iodide and silver ions are analyzed by plasma atomic emission spectrometry (ICP-AES).

EXAMPLE 1

In this example, the selectivity, vis-a-vis halide ions, of different crown-ethers used as carriers is studied. For this purpose the presence of halide, silver, thiosulfate and sulfite ions is sought in the aqueous solution. The carriers which can be used in the present invention do not extract the sulfite and silver ions from the fixing solution. This is why the results in all the examples relate only to halide and thiosulfate ions.

The results are set out in Table I.

TABLE I

| | CARRIER | HALIDE EX-TRACTION | THIOSULFATE EXTRACTION |
|---|---|---|---|
| I. | 18-crown-6 (invention) | yes | no |
| II. | Benzo-18-crown-6 (invention) | yes | no |
| III. | Dibenzo-18-crown-6 (invention) | yes | no |
| IV. | Azacrown (C1) (comparative) | no | no |
| V. | Azacrown (C2) (comparative) | no | no |
| VI. | Azacrown (D) (invention) | yes | no |
| VII. | Benzo-15-crown-5 (comparative) | no | no |
| VIII. | Thiacrown (comparative) | no | no |
| IX. | Benzyloxymethyl-15-crown-5 (comparative) | no | no |

Azacrown C₁ is 1,4,10,13-tetraoxa 7,16-diazacyclooctadecane:

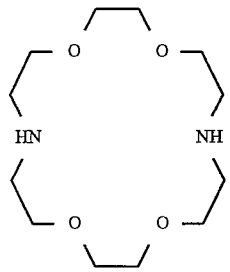

TABLE I-continued

| CARRIER | HALIDE EX-TRACTION | THIOSULFATE EXTRACTION |
|---|---|---|

Azacrown C₂ is 1,4,10-trioxa 7,13-diazacyclopentadecane:

Compound VIII, thiacrown, is 1,4,10,13-tetraoxa 7,16-dithiacyclooctadecane:

EXAMPLE 2

In this example the effect of the structure of the carrier on the % of halides extracted is studied. For this purpose carriers having the same cavity size are studied: 18-crown-6, benzo-18-crown-6, dibenzo-18-crown-6. The % of iodide extracted after 2, 5 and 22 hours are set out in Table II.

TABLE II

| CARRIER | % IODIDE extracted (2 H) | % IODIDE extracted (5 H) | % IODIDE extracted (22 H) |
|---|---|---|---|
| I. 18-crown-6 | 10 | 30 | 65 |
| II. Benzo-18-crown-6 | 4 | 5 | 30 |
| III. Dibenzo-18-crown-6 | 1 | 2 | 5 |

It can be seen in Table II that the percentage of iodide extracted from the fixing bath increases when changing from dibenzo-18-crown-6 to benzo-18-crown-6 and 18-crown-6.

EXAMPLE 3

In this example, the effect of the pH of the aqueous solution receiving the halide ions carried by the membrane on the % of halides extracted is studied. For this purpose, under the conditions of Example 1, 18-crown-6 is used as a carrier. The pH is made to vary between 2 and 10. The results are set out in FIG. 2. A significant reduction in the flow of iodide carried is observed when the pH is too acidic. On the other hand, for a pH of between 6.0 and 10.0, the % of iodide carried remains constant.

EXAMPLE 4

In this example, the stability of the membrane is studied over 72 hours, reproducing three times in succession the extraction of the halides from a fixing solution containing 700 mg ($5.5 \times 10^{-3}$ moles/liter) of iodide and 9.3 g/l of bromide (0.12 moles/l). FIG. 3 shows the percentage of iodide and bromide extracted as a function of time. Good reproducibility is observed of the iodide and bromide extraction rates, which reach 90% in 22 hours for iodide and 10% in 24 hours for bromide under the experimental conditions of Example 1.

EXAMPLE 5

This example shows the role of the concentration of carrier in the solvent, with regard to the selectivity vis-a-vis iodide, bromide and thiosulfate ions. In this example, under the conditions of Example 1, the various carriers are used at a concentration of $10^{-2}$ moles/l in chloroform. The results are given in Table III, where $S_1$ represents the selectivity vis-a-vis iodide ions compared with respect to thiosulfate ions, the quantities in parentheses being the ratios of the concentrations expressed by weight:

$$S_1 = (I^-\text{extracted}/I^-\text{initial})/(\text{thiosulfate}_{extracted}/\text{thiosulfate}_{initial}).$$

$S_2$ represents the selectivity of the bromide ions with respect to the thiosulfate ions:

$$S_2 = (Br^-_{extracted}/Br^-_{initial})/\text{thiosulfate}_{extracted}/\text{thiosulfate}_{initial}).$$

$S_3$ represents the selectivity of the iodide ions with respect to the bromide ions:

$$S_3 = (I^-_{extracted}/I^-_{initial})/(Br^-_{extracted}/Br^-_{initial}).$$

The carriers I, II, III, and VI are as defined previously.

TABLE III

| CARRIER | % I⁻ extracted in 24 h | % Br⁻ extracted in 24 h | S1 I⁻/S₂O₃⁻ | S2 Br⁻/S₂O₃⁻ | S3 I⁻/Br⁻ |
|---|---|---|---|---|---|
| I |  |  |  |  |  |
| 18-crown-6 | 96.0 | 12.9 | 1992 | 268 | 7 |
| II |  |  |  |  |  |
| B18-crown-6 | 35.4 | 2.7 | 3668 | 284 | 13 |
| III |  |  |  |  |  |
| DB18-crown-6 | 4.8 | 0.6 | 18 | 2 | 8 |
| VI |  |  |  |  |  |
| Azacrown (D) | 68.0 | 20.0 | 4533 | 1333 | 3 |

This example shows that the compounds I, II and VI make it possible to obtain an extraction of halides which is very high and very selective with respect to thiosulfate. At this concentration of carrier, the iodide ions are extracted preferentially with respect to the bromide ions; this is particularly clear with compound II.

EXAMPLE 6

This example shows the role of the concentration of carrier in the solvent, with regard to the selectivity vis-a-vis iodide, bromide and thiosulfate ions. Under the same operating conditions as in Example 1, an 18-crown-6 coming from a batch different from the previous example is used as a carrier at concentrations varying from $10^{-1}$ to $10^{-4}$ moles/l. The results are set out in Table IV.

TABLE IV

| CARRIER CONCEN- TRATION (moles/l) | % I⁻ extracted in 24 h | % Br⁻ extracted in 24 h | S1 I⁻/S₂O₃⁻ | S2 Br⁻/S₂O₃⁻ | S3 I⁻/Br⁻ |
|---|---|---|---|---|---|
| $10^{-1}$ | 78.0 | 64.0 | 4333 | 3555 | 1 |
| $10^{-2}$ | 70.4 | 19.1 | 4141 | 1118 | 4 |
| $10^{-3}$ | 32.8 | 0.2 | 1726 | 10 | 173 |
| $10^{-4}$ | 3.0 | 0.2 | 200 | 13 | 15 |

This example shows that the optimum selective extraction of the halides occurs at concentrations of between $10^{-1}$ and $10^{-2}$ moles/l. The iodide ions are extracted highly selectively with respect to the bromide ions at a concentration of between $10^{-3}$ moles/l and $10^{-4}$ moles/l.

EXAMPLE 7

This example shows that it is possible to improve the efficiency of the membrane with regard to the extraction of iodide ions by preconditioning it before use by saturation with a halide salt.

For this purpose, the procedure is as in Example 1, using 18-crown-6 as the crown-ether at a concentration of $10^{-2}$ moles/l. The results are given in % of iodide and bromide extracted in 24 hours.

TABLE III

| PRETREATMENT | % IODIDE extracted | % BROMIDE extracted |
|---|---|---|
| None | 73 | 16 |
| KI | 85 | 16 |
| NH₄Cl | 78 | 16 |
| NH₄Br | 94 | 16 |
| NH₄I | 96 | 16 |

It can be seen that the pretreatment with iodide and ammonium bromide gives better results with regard to the extraction rate of iodide ions; that of the bromide ions is not modified.

I claim:

1. Process for the selective extraction of the halide ions from photographic fixing solutions, in which a) the photographic fixing solution is brought into contact with a liquid membrane comprising a macrocyclic compound in solution in an organic solvent, so that the halide ions are transported from the photographic fixing solution in the liquid membrane, and b) the halide ions carried in the liquid membrane are extracted by bringing the membrane into contact with an aqueous solution, separate from the photographic fixing solution characterized in that the macrocyclic compound is a crown-ether compound which comprises at least six oxygen atoms and possibly sulfur or nitrogen atoms, in which two adjacent oxygen, sulfur or nitrogen atoms are separated by an alkylene group of at least two carbon atoms.

2. Process for the selective extraction of halide ions according to claim 1, in which the macrocyclic compound has one of the following formulae:

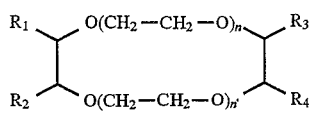

where

R$_1$, R$_2$, R$_3$ and R$_4$ represent hydrogen or an alkyl, aryl, ester, amide, carboxy, ester, sulphonamido, sulpho, alkoxy, aryloxy or polyalkoxy group, or R$_1$ and R$_2$ and/or R$_3$ and R$_4$ represent the atoms required to complete an aliphatic or aromatic ring of 5 to 7 members optionally comprising oxygen, sulfur or nitrogen heteroatoms on the ring, n and n' are between 1 and 10, the total of n and n' being at least 4; or

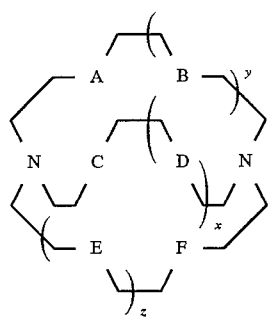

where

A, B, C, D, E, F each represent separately an oxygen or sulfur atom, or N-R$_5$ where R$_5$ is hydrogen or an alkyl radical or else represents the atoms required to form, with two of the adjacent atoms, an aliphatic or aromatic ring of 5 to 7 members optionally comprising oxygen or sulfur atoms on the ring, x, y and z are between 1 and 3, with the proviso that the oxygen atoms total at least 6.

3. Process for the selective extraction of halide ions according to claim 2, in which the macrocyclic compound is one of the following compounds:

dibenzo-18-crown 6 of formula(A)

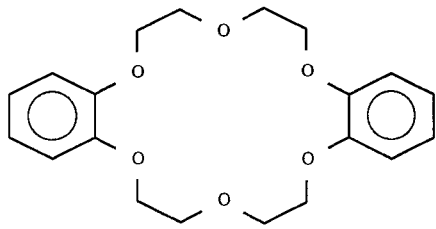

benzo-18-crown-6 of formula (B)

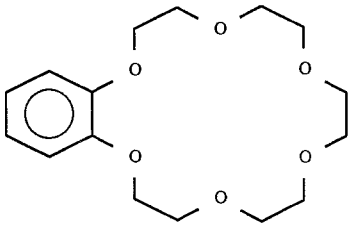

18-crown-6 of formula (C)

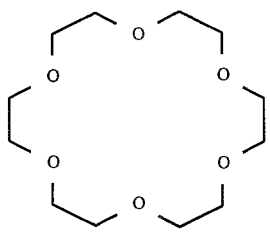

4,7,13,16,21,24-hexaoxa 1,10-diazabicyclo [8,8,8]-hexacosane of formula (D)

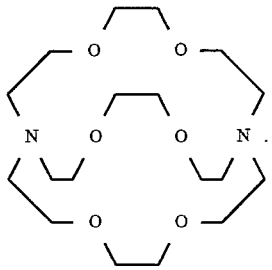

4. Process for the selective extraction of halide ions according to claim 1, in which the concentration of the macrocyclic compound in the organic solvent is between $10^{-6}$ and 1 mole/l.

5. Process for the selective extraction of halide ions according to claim 4, in which the concentration of the macrocyclic compound in the organic solvent is between $10^{-2}$ and $10^{-1}$ moles/l.

6. Process for the selective extraction of halide ions according to claim 1, in which the pH of the aqueous solution which receives the halide ions carried by the membrane is between 6 and 10.

7. Process for the selective extraction of halide ions according to claim 1, in which the liquid membrane is pretreated by saturation with a halide salt.

8. Process for the selective extraction of halide ions according to claim 7, in which the liquid membrane is pretreated by saturation with ammonium bromide or iodide.

* * * * *